United States Patent
Tsao et al.

(10) Patent No.: US 11,892,382 B2
(45) Date of Patent: Feb. 6, 2024

(54) METHOD FOR DETECTING ENVIRONMENTAL PARAMETER IN SEMICONDUCTOR FABRICATION FACILITY

(71) Applicant: TAIWAN SEMICONDUCTOR MANUFACTURING COMPANY LTD., Hsinchu (TW)

(72) Inventors: Chih-Ming Tsao, Miaoli County (TW); Tzu-Sou Chuang, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 17/460,020

(22) Filed: Aug. 27, 2021

(65) Prior Publication Data

US 2023/0066693 A1    Mar. 2, 2023

(51) Int. Cl.
*G01N 1/24* (2006.01)
*G01N 1/22* (2006.01)
*G08B 3/10* (2006.01)

(52) U.S. Cl.
CPC .............. *G01N 1/24* (2013.01); *G01N 1/2273* (2013.01); *G08B 3/10* (2013.01); *G01N 1/2205* (2013.01)

(58) Field of Classification Search
CPC ...... G01N 1/24; G01N 1/2273; G01N 1/2205; G08B 3/10
USPC .......................................................... 73/863
See application file for complete search history.

(56) References Cited

U.S. PATENT DOCUMENTS

| | | | |
|---|---|---|---|
| 6,604,405 B2 * | 8/2003 | Whynall | G01N 33/0018 73/23.31 |
| 7,341,954 B2 * | 3/2008 | Yamazaki | H01J 37/32935 438/714 |
| 7,357,144 B2 * | 4/2008 | Im | G01M 3/223 137/15.04 |

(Continued)

FOREIGN PATENT DOCUMENTS

| CN | 114723213 A | * | 7/2022 | .......... B01D 46/442 |
|---|---|---|---|---|
| CN | 115031364 A | * | 9/2022 | |

(Continued)

OTHER PUBLICATIONS

El-Awady et al., 'Integrated Bake/Chill for Photoresist Processing', IEEE Transactions on Semiconductor Manufacturing, vol. 12, No. 2, May 1999, pp. 264-266 (Year: 1999).*

(Continued)

*Primary Examiner* — Stephanie E Bloss
*Assistant Examiner* — Kevin C Butler
(74) *Attorney, Agent, or Firm* — WPAT LAW; Anthony King

(57) ABSTRACT

A method of monitoring a semiconductor fabrication facility and a semiconductor fabrication facility are provided. The method includes collecting an ambient air in a clean room through a plurality of gas lines with their gas inlets arranged at a plurality of sampling positions in the clean room. The method also includes measuring a parameter of the ambient air by a plurality of metrology devices which are connected to the gas lines. At least two of the sampling positions are measured simultaneously. The method further includes issuing a warning when the parameter detected by the metrology devices is outside a range of acceptable values.

20 Claims, 9 Drawing Sheets

(56) References Cited

U.S. PATENT DOCUMENTS

| | | | | |
|---|---|---|---|---|
| 7,534,627 B2* | 5/2009 | Michaelson | ............ | H01L 22/12 700/121 |
| 8,146,447 B2* | 4/2012 | Lee | ............ | G03F 1/82 73/863.83 |
| 8,303,715 B2* | 11/2012 | Hamelin | ............ | H01L 21/67248 118/724 |
| 8,303,716 B2* | 11/2012 | Wallace | ............ | H01L 21/68742 118/724 |
| 9,412,671 B1* | 8/2016 | Tsai | ............ | H01L 21/324 |
| 11,139,141 B2* | 10/2021 | Van Heumen | .... | H01L 21/67745 |
| 2002/0101247 A1* | 8/2002 | Whynall | ............ | G01N 33/0018 324/460 |
| 2003/0084918 A1* | 5/2003 | Kim | ............ | H01L 21/6719 134/1.2 |
| 2005/0145012 A1* | 7/2005 | Im | ............ | G01M 3/223 73/31.03 |
| 2007/0089540 A1* | 4/2007 | Brazis | ............ | H01L 22/14 73/863 |
| 2009/0112520 A1* | 4/2009 | Lymberopoulos | ...... | G06F 11/24 702/184 |
| 2009/0326703 A1* | 12/2009 | Presley | ............ | H01L 21/67727 700/121 |
| 2016/0341602 A1* | 11/2016 | Thornes | ............ | G01J 9/00 |
| 2017/0313520 A1* | 11/2017 | Tsai | ............ | G01N 1/24 |
| 2020/0006100 A1* | 1/2020 | Clark | ............ | H01L 21/67248 |
| 2020/0083074 A1* | 3/2020 | Clark | ............ | H01L 21/67253 |
| 2020/0087074 A1* | 3/2020 | Tsai | ............ | G01N 1/2226 |
| 2021/0190645 A1* | 6/2021 | Hargrove | ............ | G01N 1/2205 |
| 2022/0228955 A1* | 7/2022 | Baratto | ............ | G01N 33/0009 |
| 2022/0297170 A1* | 9/2022 | Tsao | ............ | H01J 49/0036 |
| 2022/0334570 A1* | 10/2022 | Chen | ............ | G05B 19/41885 |
| 2022/0415678 A1* | 12/2022 | Gosen | ............ | H01L 21/67201 |

FOREIGN PATENT DOCUMENTS

| | | | | |
|---|---|---|---|---|
| KR | 101462948 B1 * | 11/2014 | ............ | G01N 1/24 |
| TW | 201716616 A | 5/2017 | | |
| TW | 202041271 A | 11/2020 | | |
| WO | 2013096503 A1 | 6/2013 | | |
| WO | WO-2016035946 A1 * | 3/2016 | ............ | B01D 53/74 |
| WO | WO-2019160548 A1 * | 8/2019 | ............ | B01D 53/04 |
| WO | WO-2019160627 A1 * | 8/2019 | ............ | B01D 53/02 |
| WO | WO-2019182952 A1 * | 9/2019 | ............ | C23C 16/0272 |
| WO | WO-2019183035 A1 * | 9/2019 | ............ | G05B 13/027 |
| WO | WO-2019240906 A1 * | 12/2019 | ............ | B01D 53/30 |
| WO | WO-2021221976 A1 * | 11/2021 | | |
| WO | WO-2022040810 A1 * | 3/2022 | | |
| WO | WO-2022140073 A1 * | 6/2022 | | |

OTHER PUBLICATIONS

US 2022006547 A1 is the US counterpart of TW 202041271 A.
WO 2013096503 A1 is the PCT counterpart of TW 201716616 A.
English Abstract of TW 201716616 A.

* cited by examiner

METHOD FOR DETECTING ENVIRONMENTAL PARAMETER IN SEMICONDUCTOR FABRICATION FACILITY

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometric size (i.e., the smallest component (or line) that can be created using a fabrication process) has decreased. This scaling-down process generally provides benefits by increasing production efficiency and lowering associated costs. Such scaling-down has also increased the complexity of processing and manufacturing ICs.

ICs are typically fabricated by processing one or more wafers as a "lot" with using a series of wafer fabrication tools (i.e., "processing tools"). Each processing tool typically performs a single wafer fabrication process on the wafers in a given lot. For example, a particular processing tool may perform layering, patterning and doping operations or thermal treatment. A layering operation typically adds a layer of a desired material to an exposed wafer surface. A patterning operation typically removes selected portions of one or more layers formed by layering. A doping operation typically incorporates dopants directly into the silicon through the water surface, to produce p-n junctions. A thermal treatment typically heats a wafer to achieve specific results (e.g., dopant drive-in or annealing). As a result, wafers have to be moved between processing tools in a clean room.

BRIEF DESCRIPTION OF THE DRAWINGS

Aspects of the embodiments of the present disclosure are best understood from the following detailed description when read with the accompanying figures. It is noted that, in accordance with the standard practice in the industry, various structures are not drawn to scale. In fact, the dimensions of the various structures may be arbitrarily increased or reduced for clarity of discussion.

DETAILED DESCRIPTION

Figure 1:
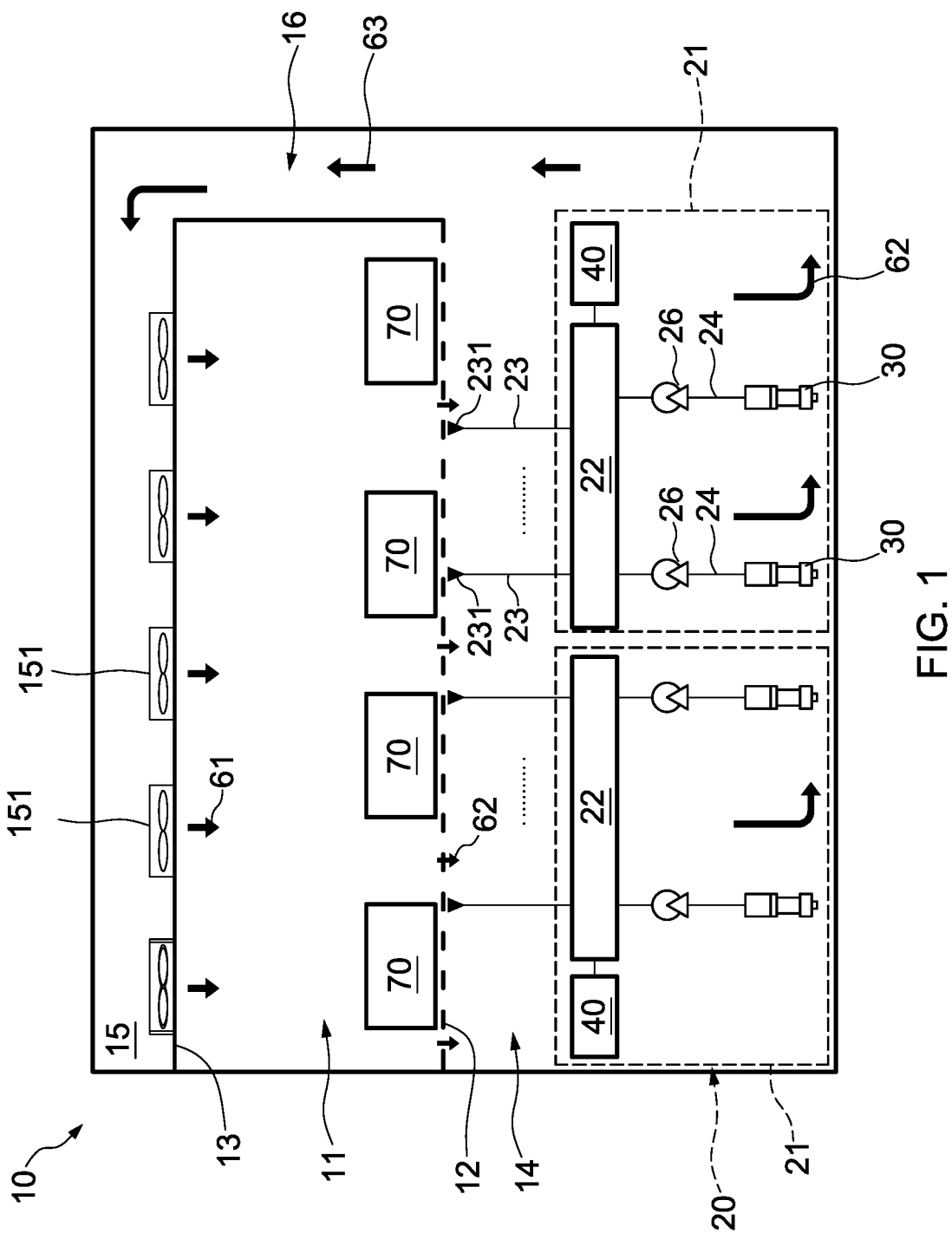
FIG. 1 shows a schematic view illustrating a semiconductor fabrication facility, in accordance with one or more embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation.

Within a semiconductor fabrication facility (FAB) environment, contaminants can be generated in the form of gases, chemical vapors, micro/nano-scale aerosol particles, airborne molecular contamination (AMC), etc. AMC may cause adverse effects on production tools and consequently increase costs for FAB. The AMC level in cleanroom environments is predominately created by internal sources of solvents and acetic acid, re-entrainment of exhaust air, aromatic compounds, as well as material outgassing. Traditional environmental monitoring in a FAB environment, however, is expensive and time consuming, relying on a deployment of human-power for sample collection and dedicated equipment for measurement/characterization.

Additionally, traditional environmental monitoring techniques do not provide continuous real-time monitoring, which means that when measurement results are provided for review, the condition of the FAB facility may have already changed.

Therefore, one objective of embodiments of the present disclosure is to provide an easier, faster and cheaper technology to realize a real-time monitoring of environment contaminant levels in a semiconductor fabrication facility, FIG. 1 shows a schematic view illustrating a semiconductor fabrication facility 10, in accordance with one or more embodiments of the present disclosure. In accordance with some embodiments, the semiconductor fabrication facility 10 includes a clean room 11, a sub-clean room 14 and an air plenum 15.

The clean room 11 is where fabrication takes place and contains the processing tools 70 for integrated circuit production such as steppers and/or scanners for photolithography, in addition to etching, cleaning, doping and dicing machines. The sub-clean room 14 is located underneath the clean room 11 and is separated from the clean room 11 by a raised floor 12. The air plenum 15 is located above the clean room 11 and is separated from the clean room 11 by a roof 13. A circulation conduit 16 connects the sub-clean room 14 to the air plenum 15. In operation, an air flow 62 which descends from the clean room 11 to the sub-clean room 14 is circulated back (i.e., air flow 63) to the air plenum 15 through the circulation conduit 16, and a clean air flow 61 actuated and filtered by a plurality of fan filter units (FFU) 151 which mounted on the roof 13 is provided to the clean room 14. As a result, a sophisticated air circulation and control can be established in the semiconductor fabrication facility 10.

In some embodiments, in the clean room 11, a number of processing tools 70 are arranged for performing different fabrication process over semiconductor wafers. The processing tools 70 may include any type of wafer processing tools used in semiconductor chip fabrication. For example, some of the processing tools 70 are deposition tools for forming a material layer over semiconductor wafers, and the other of the processing tools 70 are lithography tools for performing a lithography process over the material layer formed on the semiconductor wafers. In addition, the processing tools 70 may further include metrology, inspection, testing or other tools. The processing tools 70 used for performing different processes may be located in different processing areas (such as photolithography area, diffusion area, etch area, ion implant area, thin films area and polish area) in the clean room 11, and two neighboring processing areas may have different controlled environments (such as temperature or humidity or other environmental factors).

The semiconductor wafer to be processed in the present disclosure may be made of silicon or other semiconductor materials. Alternatively or additionally, the semiconductor wafer may include other elementary semiconductor materials such as germanium (Ge). In some embodiments, the semiconductor wafer is made of a compound semiconductor such as silicon carbide (SiC), gallium arsenic (GaAs), indium arsenide (InAs), or indium phosphide (InP). In some embodiments; the semiconductor wafer is made of an alloy semiconductor such as silicon germanium (SiGe), silicon germanium carbide (SiGeC), gallium arsenic phosphide (GaAsP), or gallium indium phosphide (GaInP). In some embodiments, the semiconductor wafer includes an epitaxial layer. For example, the semiconductor wafer has an epitaxial layer overlying a bulk semiconductor. In some other embodiments, the semiconductor wafer may be a silicon-on-insulator (SOI) or a germanium-on-insulator (GOI) substrate.

The semiconductor wafer may have various device elements. Examples of device elements that are formed in the semiconductor wafer include transistors (e.g., metal oxide semiconductor field effect transistors (MOSFET), complementary metal oxide semiconductor (CMOS) transistors, bipolar junction transistors (BJT), high voltage transistors, high-frequency transistors, p-channel and/or n-channel field-effect transistors (PFETs/NFETs), etc.), diodes, and/or other applicable elements. Various processes are performed to form the device elements, such as deposition, etching, implantation, photolithography, annealing, and/or other suitable processes. In some embodiments, a shallow trench isolation (STI) layer, an inter-layer dielectric (ILD), or an inter-metal dielectric layer covers the device elements formed on the semiconductor wafer.

In accordance with some embodiments, the semiconductor fabrication facility 10 further includes a first detection system 20. The first detection system 20 is configured to monitor at least one parameter of an ambient air in the clean room 11 in real-time. In some embodiments, the first detection system 20 is arranged in the sub-dean room 14 and includes a number of chassis 21, a number of gas lines 23, a number of valve assemblies 22, a number of pumps 26 and a number of metrology devices 30. In some embodiments, as shown in FIG. 1, each of the gas lines 23 has a gas inlet 231 for collecting ambient air from the clean room 11. In some embodiments, the raised floor 12 comprises a number of waffle slabs arranged in a horizontal plane, and each one of the waffle slabs has a number of through holes for air communication from the clean room 11 to the sub-clean room 14. The gas inlets 231 of the gas lines 23 may be positioned in the through holes of the waffle slabs. However, it will be appreciated that many variations and modifications can be made to embodiments of the disclosure. The gas inlets 231 of the gas lines 23 may be positioned above upper surfaces of the raised floor 12 or positioned below lower surfaces of the raised floor 12.

Figure 2:
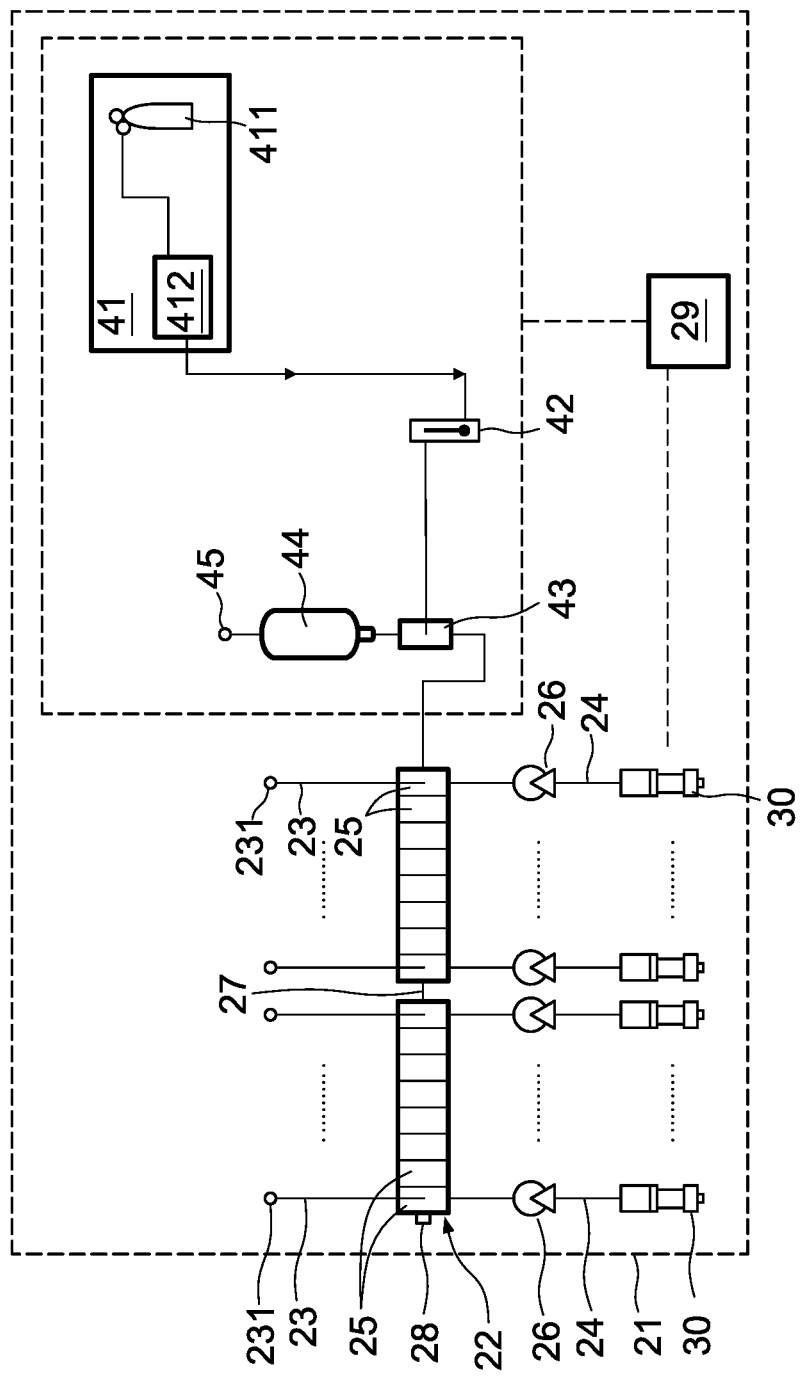
FIG. 2 shows a schematic view of a first detection system, in accordance with one or more embodiments of the present disclosure.

FIG. 2 shows a schematic view of the first detection system 20, in accordance with one or more embodiments of the present disclosure. In some embodiments, each of valve assemblies 22 includes two groups of solenoid valves 25. The two groups of solenoid valves 25 are communicated with each other through a connection gas line 27. In each of the groups, there are eight solenoid valves 25 arranged side by side. The solenoid valves 25 may include three connection ports and two states. Alternatively, the solenoid valves 25 may include four connection ports and two states. Each of the solenoid valves 25 includes a first connection port that is connected to a lower end of one of the gas lines 23 and a second connection port that is connected to a downstream line 24 that is connected to the metrology devices 30. The pumps 26 may be connected to the downstream lines 24 for actuating the flow of the gas from the solenoid valves 25 into the metrology devices 30. In some embodiments, the eight solenoid valves 25 that are arranged side by side are fluidly connected to one another. A connection port of the solenoid valve 25 that is arranged at one end of the valve assembly 22 is covered by the cap 28. In addition, a connection port of the solenoid valve 25 that is arranged at another end of the valve assembly 22 is connected to a calibration assembly 40.

The metrology devices 30 can provide real-time monitoring of environmental parameters, such as for instance temperature, humidity, magnetic field, contaminant levels (e.g., micro/nano-scale particles and AMC), etc. in the clean room 11. In some embodiments, each of the metrology devices 30 includes a photo ionization detector (hereinafter referred to as PID 30) and is configured to detect a total organic carbon (TOC) concentration, such as concentration of isopropyl alcohol (IPA). The measurement of the organic content produced by PID does not account for the type of organic but can provide real-time monitoring of the concentration of organic content.

Figure 3:
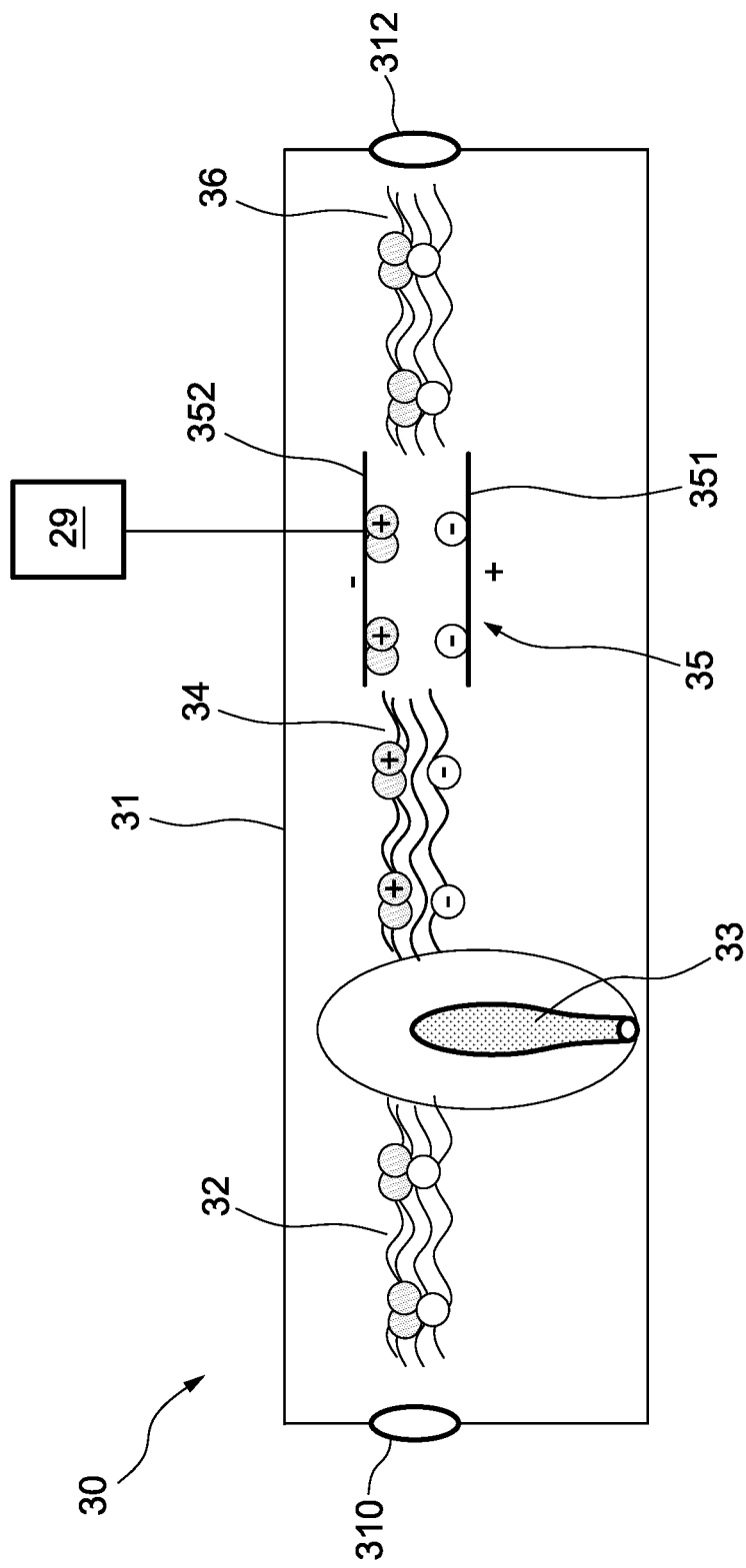
FIG. 3 shows one exemplary embodiment of a photo ionization detector in accordance with some embodiments of present disclosure.

FIG. 3 shows one exemplary embodiment of the PID 30 in accordance with some embodiments of present disclosure. In some embodiments, the PID 30 includes a housing 31, a UV lamp 33 and a detecting unit 35 and a number of segments of flowing path, such as first segment 32, second segment 34 and third segment 36. The first segment 32 of the flowing path is between the inlet port 310 to the UV lamp 33. The second segment 34 of the flowing path connects the UV lamp 33 to the detecting unit 35. The third segment 36 of the flowing path connects the detecting unit 35 to the outlet port 312. The detecting unit 35 includes electrodes 351 and 352 and is electrically connected to a controller 29.

In operation, the air flow entering the housing 31 from the downstream line 24 (FIG. 2) is bombarded by high-energy UV photons generated by the UV lamp 33 and is ionized when they absorb the UV light, resulting in ejection of electrons and the formation of positively charged ions. The electrically charged molecules are then delivered to second segment 34 and enter a channel formed between two electrodes 351 and 352 of the detecting unit 35 by a pressure differential formed between the inlet port 310 and the outlet port 312. The ions produce an electric current, which is the signal output of the detecting unit 35. The greater the concentration of the component in the air flow, the more ions are produced, and the greater the current. The current is amplified and displayed on a controller 29 (e.g., an ammeter or digital display.) Since PID 30 is non-destructive, other sensors can be connected to the outlet port 312 of the PID 30 for detecting other parameters. PID 30 are broad band and not selective, as these may ionize everything with an ionization energy less than or equal to the lamp photon energy. In one exemplary embodiment, the UV lamps have photons energy upper limits of approximately 8.4 eV, 10.0 eV, 10.6 eV, and 11.7 eV.

Figure 4:
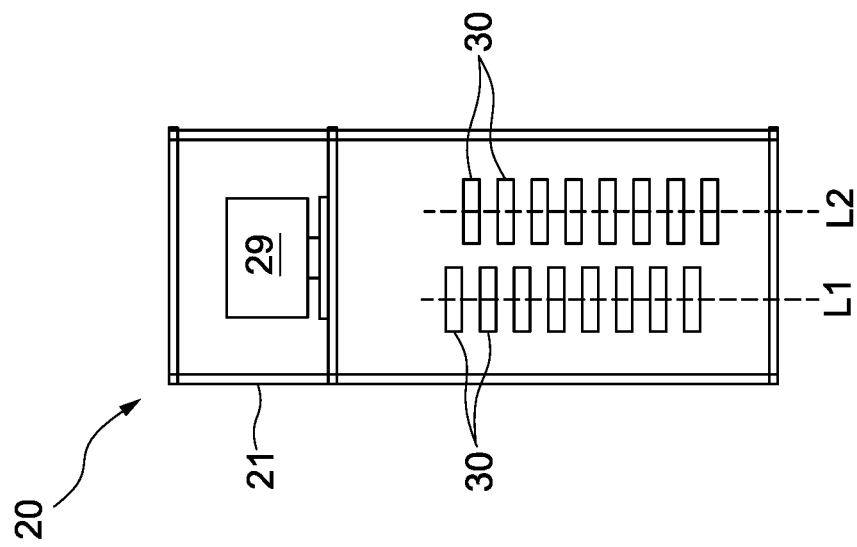
FIG. 4 shows a schematic view of a first detection system, in accordance with one or more embodiments of the present disclosure.

FIG. 4 shows a schematic view of the first detection system 20, in accordance with one or more embodiments of the present disclosure. In some embodiments, sixteen (16) PIDs 30 are positioned in a lower deck of the chassis 21 with eight (8) PIDs 30 arranged along a first reference line L1 and eight (8) PIDs 30 arranged a second reference line L2. The first reference line L1 may be parallel to the second reference line L2. The PIDs 30 in the first reference line L1 and the PIDs 30 in the second reference line L2 may be in staggered arrangement for a more compact arrangement in the chassis 21. The controller 29 may be positioned in the upper deck of the chassis 21 and configured to process signals produced by the PIDs 30 located in the same chassis 21.

Figure 5:
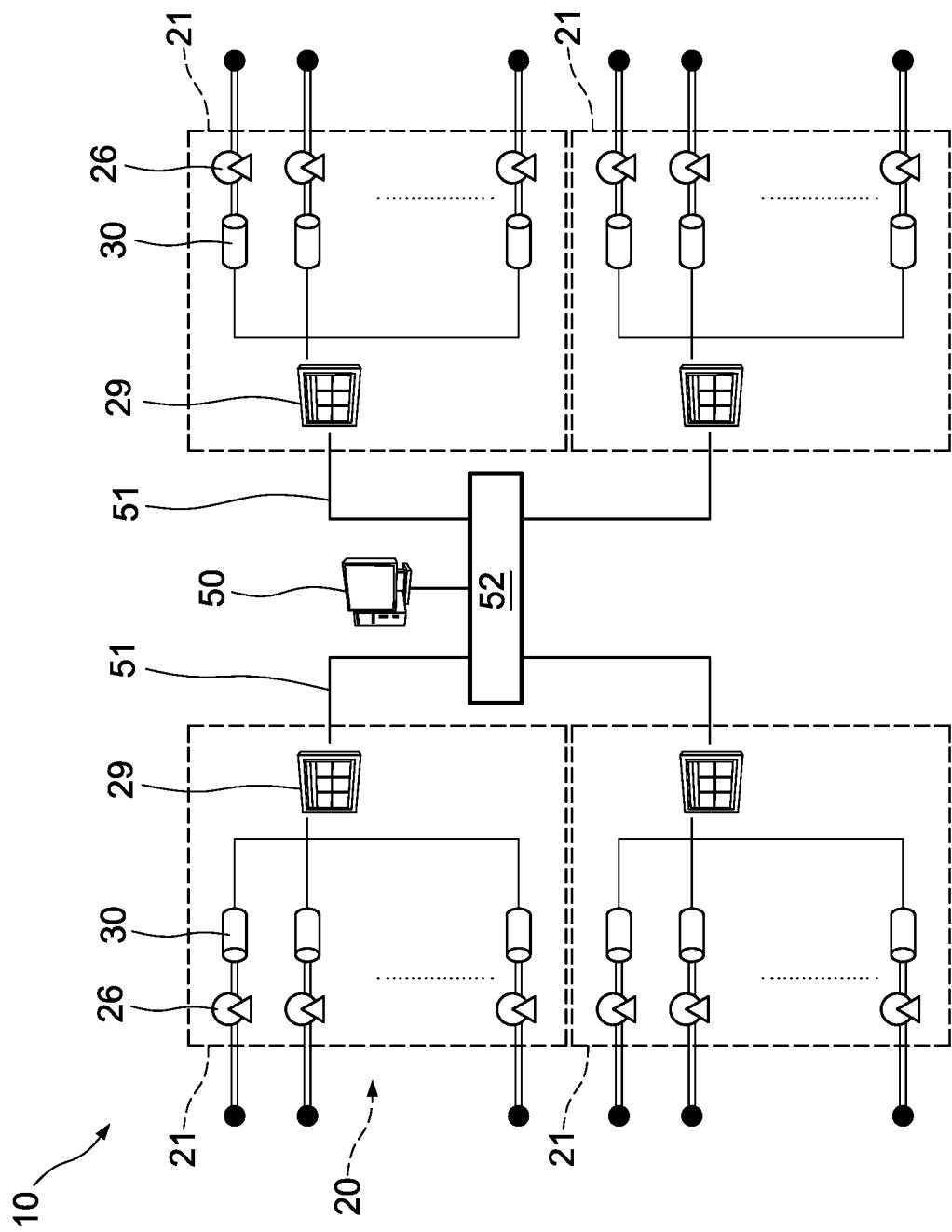
FIG. 5 shows a schematic view illustrating a semiconductor fabrication facility, in accordance with one or more embodiments of the present disclosure.
Figure 6:
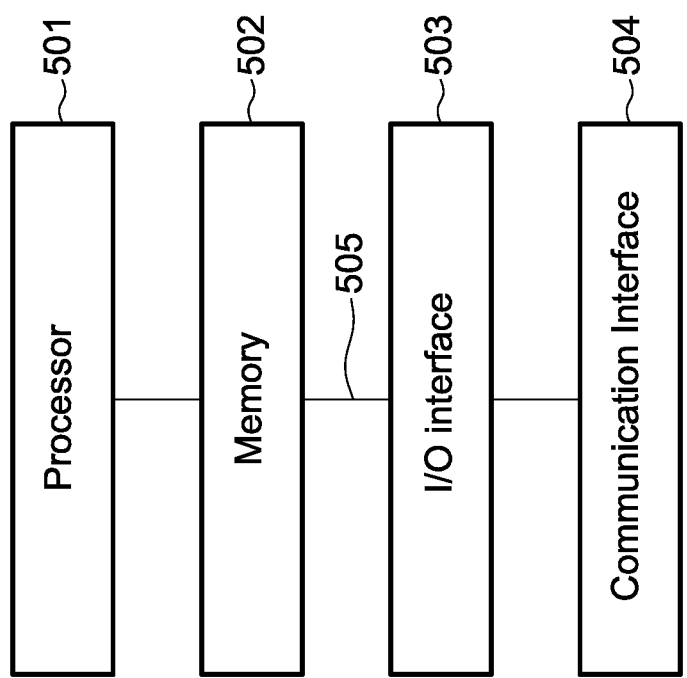
FIG. 6 shows a block diagram of a database server shown in FIG. 5, in accordance with some embodiments of the present disclosure.

In some embodiments, as shown in FIG. 5, the signals obtained from the PIDs 30 arranged in different chassis 21 are transmitted through communication lines 51 and Ethernet hub 52 to a database server 50 for further processing, in accordance with various embodiments. FIG. 6 shows a block diagram of the database server 50 shown in FIG. 5, in accordance with some embodiments of the present disclosure. The database server 50 may comprise a processor, a memory, an input/output interface (hereinafter "I/O interface"), a communications interface, and a system bus.

The processor 501 may comprise any processing circuitry operative to control the operations and performance of the database server 50. In various aspects, the processor 501 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device.

In some embodiments, the memory 502 may comprise any machine-readable or computer-readable media capable of storing data, including both volatile/non-volatile memory and removable/non-removable memory which is capable of storing one or more software programs. The software programs may contain, for example, applications, user data, device data, and/or configuration data, archival data relative to the environmental parameter or combinations therefore, to name only a few. The software programs may contain instructions executable by the various components of the database server 50. For example, memory 502 may comprise read-only memory (ROM), random-access memory (RAM), dynamic RAM (DRAM); disk memory (e.g., floppy disk, hard drive; optical disk, magnetic disk), or card (e.g., magnetic card, optical card), or any other type of media suitable for storing information. In one embodiment, the memory 502 may contain an instruction set stored in any acceptable form of machine readable instructions. The instruction set may include a series of operations after an abnormality is found in the semiconductor fabrication facility 10 based on the signals obtained by PIDs 30.

In some embodiments, the I/O interface 503 may comprise any suitable mechanism or component, to at least enable a user to provide input to the database server 50 or to provide output to the user. For example, the I/O interface 503 may comprise any suitable input mechanism, including but not limited to, a button, keypad, keyboard, click wheel, touch screen, or motion sensor. In some embodiments, the I/O: interface 503 may comprise a capacitive sensing mechanism, or a multi-touch capacitive sensing mechanism (e.g.; a touch screen). In some embodiments, the I/O interface 503 may comprise a visual peripheral output device for providing a display visible to the user. For example, the visual peripheral output device may comprise a screen such as, for example, a Liquid Crystal Display (LCD) screen.

In some embodiments, the communications interface 504 may comprise any suitable hardware, software, or combination of hardware and software that is capable of coupling the database server 50 to one or more networks and/or additional devices (such as, for example, the valve assembly 22, the pumps 26, the metrology devices 30, the calibration assembly 40, the processing tools 70). The communications interface 504 may be arranged to operate with any suitable technique for controlling information signals using a desired set of communications protocols, services or operating procedures. The communications interface 504 may comprise the appropriate physical connectors to connect with a corresponding communications medium, whether wired or wireless. In some embodiments, the database server 50 may comprise a system bus 505 that couples various system components including the processor 501, the memory 502, and the I/O interface 503, The system bus 505 can be any custom bus suitable for computing device applications.

Referring FIG. 2, the calibration assembly 40 is configured to perform a calibration process to correct an error of PIDs for maintaining the quality of measurement as well as to ensure the proper working of PIDs. In some embodiments, the calibration assembly 40 includes a gas source module 41, a flow regulator 42, a solenoid valve 43 and a filter member 44. The gas source module 41 may include a gas tank 411 and a manifold 412. The gas tank 411 stores a standard gas for calibration. The manifold 412 receives gas from the gas tank 411 and/or other gas source (e.g., clean dry air, CDA) and transmits the gas to the flow regulator 42. The flow regulator 42 controls a flowing rate of the gas supplying to the solenoid valve 43. The solenoid valve 43 controls the flow of the gas from the gas source module 41 or the zero gas source 45 to the PIDs 30. The gas from the solenoid valve 43 may be supplied to the PIDs 30 through the solenoid valves 25 and the downstream lines 24 or through the downstream lines 24 but bypassing the solenoid valves 25.

During a calibration process, the zero-order standard gas (such as nitrogen gas) is supplied to the PIDs 30 first to execute a zero-order calibration. After zero-order calibration, a standard gas (such as acetone gas) is supplied to the PIDs 30 to execute a full-width calibration. An adjustment is made to respective PIDs 30 when the output or indication on PIDs 30 in either zero-order calibration or full-width calibration does not agree with value of the applied standard.

Figure 7:
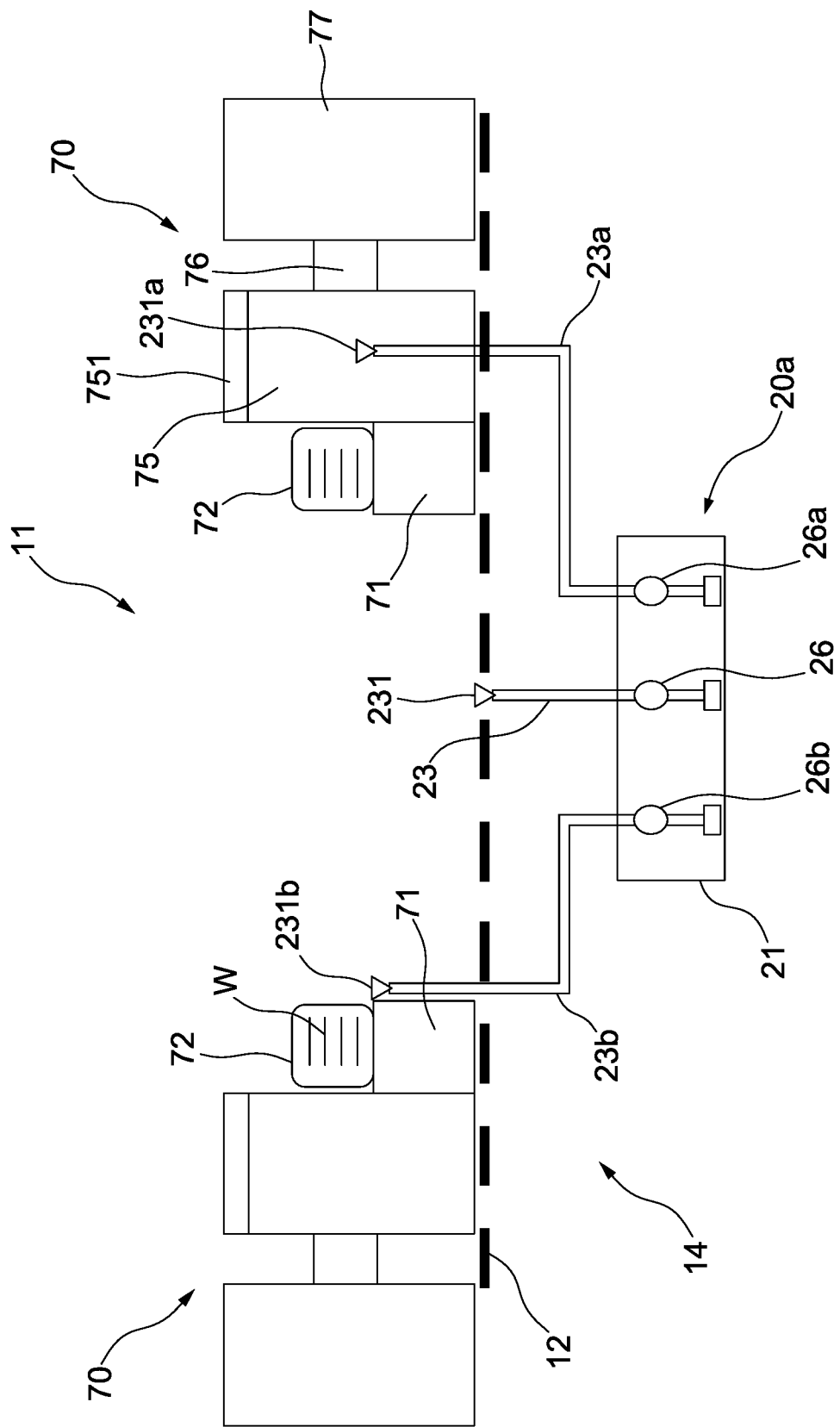
FIG. 7 shows a schematic view diagram illustrating a semiconductor fabrication facility, in accordance with some embodiments of the present disclosure.

FIG. 7 shows a schematic view diagram illustrating a semiconductor fabrication facility 10a, in accordance with some embodiments of the present disclosure. The components in FIG. 7 that use the same reference numerals as the components of FIG. 1 refer to the same components or equivalent components thereof. For the sake of brevity, it will not be repeated here. Differences between the semiconductor fabrication facility 10a and the semiconductor fabrication facility 10 include the first detection system 20a including a number of gas lines having their gas inlets positioned at different levels relative to the raise floor 12.

Specifically, as shown in FIG. 7, the first detection system 20a includes three gas lines 23, 23a and 23b for collecting ambient air in the clean room 11 or inside the processing tool 70 for measurements. The gas inlet 231 of the gas line 23 is positioned at the upper surface of the raise floor 12 to collect ambient air around the raised floor 12. The gas inlet 231a of the gas line 23a is positioned inside the processing tool 70 to collect gas inside the processing tool 70. For example, the gas line 23a may be connected to an interface 75 of the processing tool 70 which is positioned between a load port 71 and a load lock module 76. A transferring member (e.g., robot arm, not shown in figures) may be positioned in the interface 75 to transport the wafer from the wafer carrier 72 to the load lock module 76. Before the air supplied into the interface 75 of the processing tool 70 from the clean room 11, the air may be filtered by the filter 751 positioned on the top of the interface 75. The filter 751 may include a high efficiency particulate air filter. The load lock module 76 is a vacuum chamber used for loading semiconductor wafers from ambient air pressure conditions (e.g., interface 75) into the main vacuum processing chamber (e.g., processing chamber 77.) With the gas line 23a, an abnormity inside the interface 75 can be monitored in a real-time. As a result, wafer contamination can be prevented or mitigated during the transportation of wafer in the interface 75.

The gas inlet 231b of the gas line 23b is positioned on a load port 71 of the processing tool 70 to collect ambient air around the load port 71 or the wafer carrier 72. The load port 71 is configured to support and dock the wafer carrier 72 for facilitating the insertion of wafer into, and their subsequent removal from, the processing tool 70. The wafer carrier 72 may be standard mechanical interfaces (SMIFs) for loading semiconductor wafers W each having a diameter of 200 mm. Alternatively the wafer carrier 72 may be front opening unified pods (FOUPs), which may be used to load 300 mm or 450 mm semiconductor wafers, or semiconductor wafers with larger diameters. With the gas line 23b, an abnormity around the load port 71 or the wafer carrier 72 can be monitored in a real-time. As a result, wafer contamination can be prevented or mitigated during the transportation of wafer between the wafer carrier 72 and the processing tool 70.

It would be noted that the sampling positions (i.e., the position of the gas inlets of the gas lines) of the detection system is not limited to the embodiment of FIG. 7. The sampling positions can be set at any desired positions in the clean room 11. These sampling positions may be placed at a position where operators believe that semiconductor wafers may be contaminated by AMC substances as long as the gas line can be extended to the desired position. In one exemplary embodiment, a length of each of the gas lines of the first detection system 20 is in a range from about 25 m to about 75 m, preferably less than 50 m.

Figure 8:
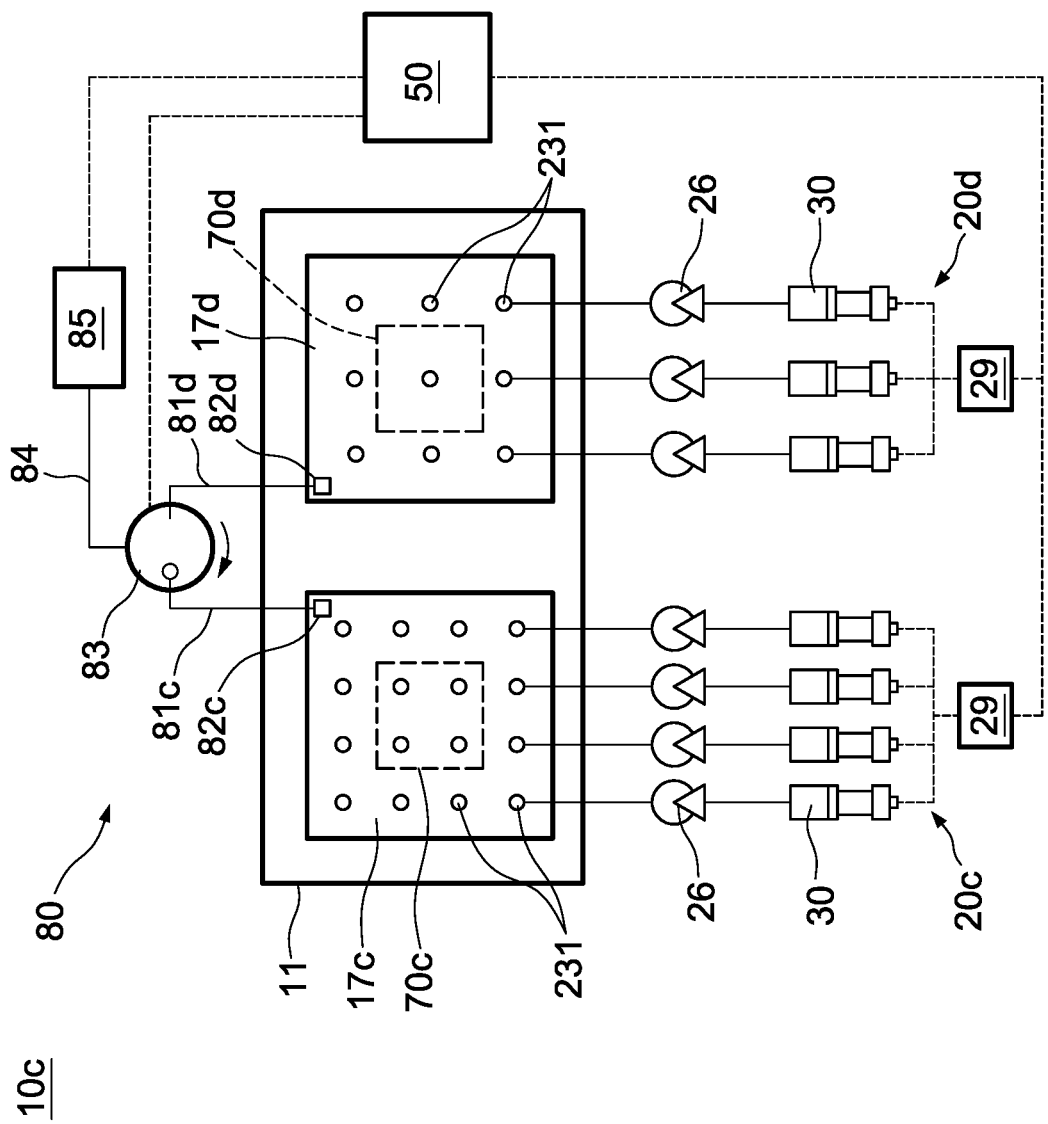
FIG. 8 shows a schematic view diagram illustrating a semiconductor fabrication facility, in accordance with some embodiments of the present disclosure.

FIG. 8 shows a schematic view diagram illustrating a semiconductor fabrication facility 10c, in accordance with some embodiments of the present disclosure. The components in FIG. 8 that use the same reference numerals as the components of FIG. 1 refer to the same components or equivalent components thereof. For the sake of brevity, it will not be repeated here. Differences between the semiconductor fabrication facility 10c and the semiconductor fabrication facility 10 include the semiconductor fabrication facility 10c having varied densities of sampling positions in different processing zones in the clean room 11.

In some embodiments, the clean room 11 includes a number of different processing areas. The processing areas may be separated from each other by partition walls, and each of the processing areas has its own gateway for the entrance of operators. For example, as shown in FIG. 8, the clean room 11 may include a first processing area 17c and a second processing area 17d. In the first processing area 17c, a photolithography process may be executed over one batch of semiconductor wafers by the processing tool 70c. In the second processing area 17d, a deposition process and an etch process may be executed over another batch of semiconductor wafers by the processing tool 70d.

In some embodiments, the number of sampling positions per unit area in the first processing area 17c is different from the number of the sampling positions per unit area in the second processing area 17d. For example, as shown in FIG. 8, the area of the first processing area 17c is the same as that of the second processing area 17d. There are sixteen (16) sampling positions 231 in the first processing area 17c, and there are nine (9) sampling positions 231 in the second processing area 17d. However, it will be appreciated that many variations and modifications can be made to embodiments of the disclosure. In some other embodiments, the number of sampling positions per unit area in the first processing area 17c is the same as the number of the sampling positions per unit area in the second processing area 17d.

In some embodiments, the sampling positions 231 are arranged in arrays, and distance between two neighboring sampling positions 231 in the same processing area is the same. In the embodiment shown in FIG. 8, distance between two neighboring sampling positions 231 in the first processing area 17c is smaller than the distance between two neighboring sampling positions 231 in the second processing area 17d. In some embodiments, the sampling positions 231 are evenly dispersed in the semiconductor fabrication facility 10c regardless of the positon of the processing tool. For example, some sampling positions 231 in the first processing area 17c is covered by the processing tool 70c, and some sampling positions 231 in the second processing area 17d is covered by the processing tool 70d.

In some embodiments, the semiconductor fabrication facility 10c further includes a second detection system 80. The second detection system 80 is configured to measure a parameter of the ambient air in all areas of the semiconductor fabrication facility 10c, In some embodiments, the second detection system 80 includes a number of sampling tubes, such as sampling tubes 81c and 81d, a rotary switch valve 83, a connection line 84 and a detector 85. The sampling tubes 81c and the sampling tubes 81d are respectively connected to the first processing area 17c and the second processing area 17d. The sampling tubes 81c and the sampling tubes 81d sample the ambient gas in the first processing area 17c and the second processing area 17d via their gas inlets 82c and 82d. The sampling tubes Sic and the sampling tubes 81d are coupled to the rotary switch valve 83. The rotary switch valve 83 is selectively fluidly connected to one of the sampling tubes 81c and the sampling tubes 81d at one time. The rotary switch valve 83 fluidly communicates one of the sampling tubes Sic and the sampling tubes 81d to the detector 85 through the connection line 84. The rotary switch valve 83 and the detector 85 may be electrically connected to the database server 50. The detector 85 sends data associated with the substance of ambient air to the database server 50 for further processing. The database server 50 may send control signal to rotate the rotary switch valve 83 to control the connection of the rotary switch valve 83 to one of the sampling tubes 81c and the sampling tubes 81d.

In some embodiments, the detector 85 can be a chromatography instrument. A chromatography instrument typically together with a mass spectrometry instrument can be used to provide detailed analysis of contamination species and their concentration. Qualitative and quantitative analyses of common ions in their different forms and matrices in trace and ultra-trace concentrations can be detected using this method. In some embodiments, the detector 85 includes a gas chomatographer with a mass spectrometer (GC-MS). The GC-MS can be used to as an AMC detector to measure species and their concentration of volatile AMC contaminants (e.g., TOC) in the semiconductor fabrication facility 10. The GC-MS is a relatively expensive instrument and the time for analyzing may use about one hour. Therefore, multiple processing areas of the semiconductor fabrication facility 10 are monitored by one GC-MS. In operation, the rotary switch valve 83 alternately connects the sampling tubes Sic and 81d to the detector 85 to measure the species and their concentration of volatile AMC contaminants in one of the first processing area 17c and the second processing area 17d at one time.

Figure 9:
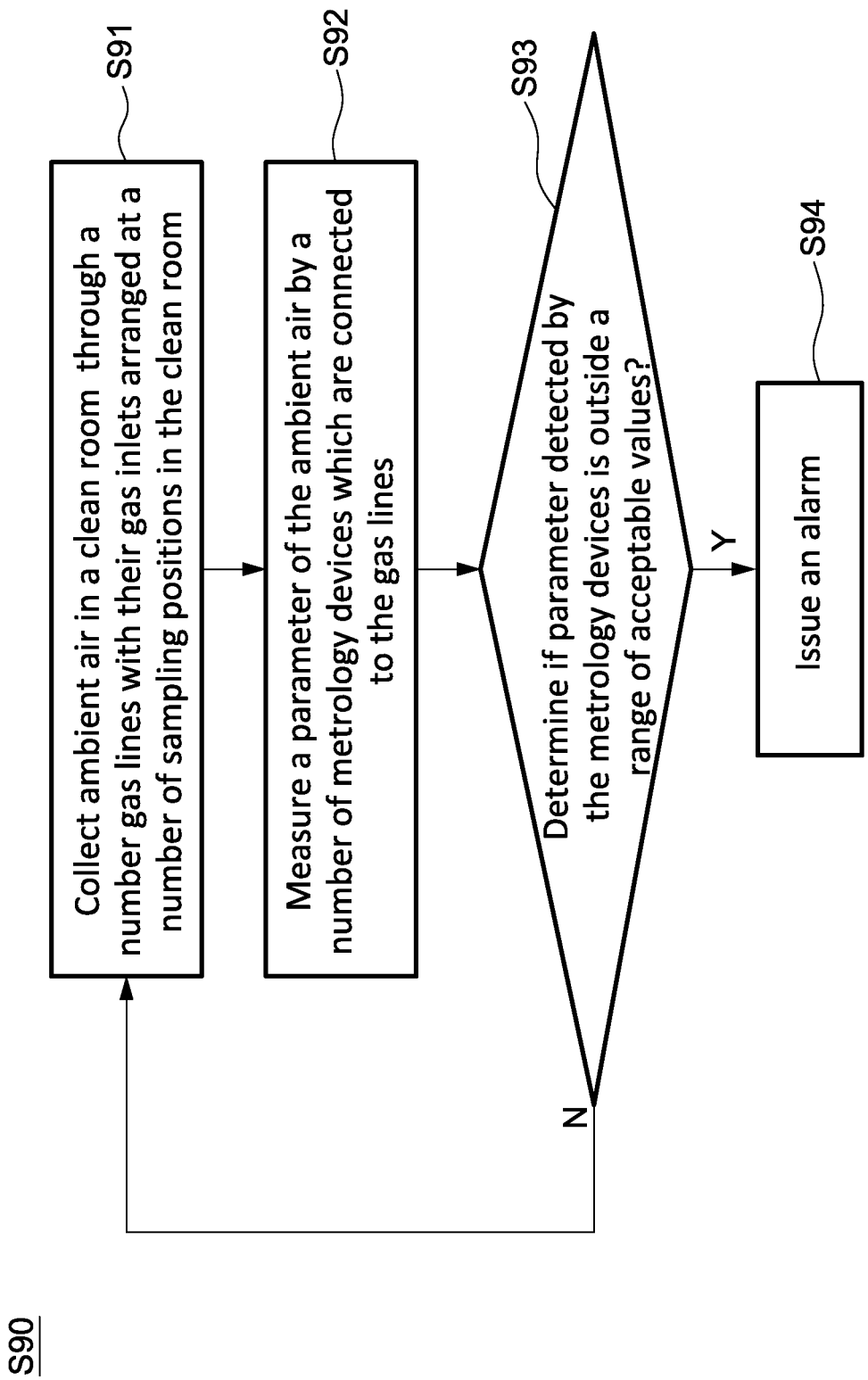
FIG. 9 shows a flow chart illustrating a method of monitoring a semiconductor fabrication facility, in accordance with various aspects of one or more embodiments of the present disclosure.

FIG. 9 is a flow chart illustrating a method S90 of monitoring a semiconductor fabrication facility, in accordance with various aspects of one or more embodiments of the present disclosure. For illustration, the flow chart will be described along with the drawings shown in FIGS. 1-8. Some of the described stages can be replaced or eliminated in different embodiments.

The method S90 includes operation S91, in which the ambient air in the clean room 11 is collected through a number gas lines 23 with their gas inlets 231 arranged at a number of sampling positions in the clean room 11. In some embodiments, the ambient air in the clean room 11 is pumped into each of the gas lines 23 by the pump 26 connected thereto. In some embodiments, the pumps 26 are controlled independently. As a result, the time at which the ambient air is collected into the gas lines 23 can be accurately controlled.

In some embodiments, the pumps 26 that are connected to the gas lines 23 which are arranged in the same processing area, such as processing area 17c or 17d shown in FIG. 7, are controlled to collect the ambient air into the gas lines 23 simultaneously. However, the time interval for pumping the ambient air in the processing area 17c is different from the time interval for pumping the ambient air in the processing area 17d. For example, the time interval for pumping the ambient air in the processing area 17c is less than 2 seconds, and the time interval for pumping the ambient air in the processing area 17d is about 2 seconds.

In some embodiments, the pumps 26 that are connected to the gas lines 23 which are arranged in the same processing area, such as processing area 17c or 17d shown in FIG. 7, are controlled to collect the ambient air in the gas lines 23 at different time or frequency. For example, the pump 26a for collecting the ambient air in the interface 75 of the processing tool 70 through the gas lines 231a is controlled to have a shorter time interval than that of the pump 26 during the transportation of a semiconductor wafer W between the wafer carrier 72 and the load lock module 76. In addition, the pump 26b for taking in the ambient air around the load port 71 is controlled to have a shorter time interval than that of the pump 26 during the placement of the wafer carrier 72 on the load port 71. By controlling the pump to have a higher operation frequency, more data in relation to the parameter of the ambient air around the load port 71 and/or the ambient air in the interface 75 can be collected.

The method S90 further includes operation S92, in which a parameter of the ambient air is measured by a number of metrology devices 30 which are connected to the gas lines 23. In some embodiments, TOC concentration of the ambient air is measure by the metrology devices 30. The metrology devices 30 includes PID to detect TOC concentration by measure an electrical current generated by the ionized air in the ND 30. In some embodiments, the operation of the UV lamp 33 in the PID 30 is synchronized with the operation of the pump 26 which connects to the same gas line 23. As a result, the measurement frequency of the PID 30 is synchronized with the operation frequency of the pump 26.

In some embodiments, the data in relation to the TOC concentration of the ambient air is transmitted from the PIDs 30 to the controller 29 first. Before transmitting the data to the database server 50, the controller 29 may preliminarily filter extreme values to avoid false alarm being triggered. For example, if a difference of the concentration detected by two neighboring sampling positions exceeds a predetermined value, the controller 29 determines that the measurement result is an error signal and the signal is not sent to the database server 50. At this time, the controller 29 may terminate the measurement process of operation S92 and initiate a calibration process to correct an error of PIDs 30 for maintaining the quality of measurement.

In some embodiments, more than one parameters of the ambient air are measured in operation S92. For example, another detector for measuring different parameter, such as temperature, humidity, magnetic field, contaminant levels (e.g., micro/nano-scale particles) can be connected downstream of the metrology devices 30. The data in relation to the measurement results are transmitted to the controller 29 and the database server 50 for further processing. However, it will be appreciated that many variations and modifications can be made to embodiments of the disclosure. In some other embodiments, the ambient gas which is measured by the PIDs 30 is exhausted to the sub-clean room 14 directly through outlet port 312, and no further measurement is conducted.

The method S90 also includes operation S93, in which the data associated with the measured TOC concentration produced in operation S92 is compared with data associated with the expected TOC concentration. The expected value of TOC concentration may be applied into the database server 50 by engineering/process knowledge. For example, when it has been observed that a normal condition in the semiconductor fabrication facility 10 consistently occurs at a specific TOC concentration, such TOC concentration is established as normal TOC concentration and is applied into the database server 50.

In some embodiments, the expected value of TOC concentration at two locations may be different. For example, as shown in FIG. 8, the expected value of TOC concentration at the processing area 17c is smaller than the expected value of TOC concentration at the processing area 17d because the process executed in the processing area 17c may be more sensitive to TOC than the process executed in the processing area 17d. However, it should be appreciated that many variations and modifications can be made to embodiments of the disclosure. The expected value in all locations may be the same.

In some embodiments, before analyzing the TOC concentration, a range of acceptable values for the measured TOC concentration is determined. The range of acceptable values for the measured TOC concentration may be a standard deviation from an expected value. In some embodiments, the range of acceptable values for the measured TOC concentration may be a specific ratio of the expected TOC concentration in the corresponding sampling position. For example, an upper threshold of the value is set at the expected TOC concentration plus about 2% of the TOC concentration, and a lower threshold is set at the expected TOC concentration minus about 2% of the level of TOC concentration. The difference between the upper threshold and lower threshold at a specific sampling position is referred to as the range of acceptable values. In some embodiments, the measured TOC concentration obtained in operation S92 is analyzed by the database server 50.

After the range of acceptable values for the measured TOC concentration is determined, the database server 50 analyzes the measured IOC concentration to determine if the measured TOC concentration is within the acceptable range.

After the analysis, if the measured TOC concentration is within the range of acceptable values, the method repeats operation S91 and S92 until the predetermined period for monitoring the semiconductor fabrication facility 10 is finished. However, if the measured. TOC concentration exceeds the range of acceptable values, the method continues with operation S94, in which an alarm condition is indicated.

In some embodiments, when the data processed by the database server 50 indicates that the measured environmental conditions has departed from the expected TOC concentration (in other words, when the database server 50 detects a fault or abnormality), the database server 50 triggers an alarm. In some embodiments, out-of-specification data indicates a fault (or abnormality) in the semiconductor fabrication facility 10, such as a generation of outgassing in a specific sampling position or a chemical leak (such as gas or liquid) from one of the processing tool that is positioned in the vicinity of the sampling position.

It has been observed that the increasing of the TOC concentration will cause adverse effect on the semiconductor wafer W. Therefore, to protect the semiconductor wafer W from damage, the database server 50 notifies an operator and indicates the location where the fault has occurred so that any issues with the fabrication system 30 may be identified and remedied. For example, the operator may replace the filters in the fan filter units 151 above the identified location after the warning is issued. Alternatively, the operator may replace the filter 751 in the identified interface 75 after the warning is issued. In another exemplary embodiment, the database server 50 shuts down the operation of the processing tools located around the identified locations so as to stop the process being performed in these processing tools.

In some embodiments, after an issuance of the warning, the database server 50 issues a control signal to the rotary switch valve 83 to fluidly connect one of the first processing area 17c and the second processing area 17d at which an abnormality occurs. Afterwards, the ambient air in the identified processing area is collected and analyzed by the detector 85 to acquire detailed analysis of contamination species and their concentration of the TOC substance. When the semiconductor wafer is scraped due to contamination in the identified processing area, this analysis results can help operators find out the source of contamination and avoid subsequent wafer contamination.

In some embodiments, a TOC concentration contour map of the clean room 11 is produced. The TOC concentration contour map may be plotted by inverse distance weighted (IDW) or Kriging method by the measurement results produced in operation 892 and data in relation to locations of the sampling positions. The TOC concentration contour map may be converted into a real-time TOC concentration contour animation through which an operator can monitor the change of the TOC concentration in the clean room 11. Alternatively, the data in relation to locations of the sampling positions and the collected concentration can be stored in database. The data can be collected for a predetermined time, and the system may display areas with high AMC concentration in the clean room and trend charts based on long-term trends, and send reports regularly as a basis for manufacturing environment quality maintaining or clean room operation quality management.

Embodiments of the present disclosure provide a method of monitoring a semiconductor fabrication facility by collecting and analyzing ambient air at a number of sampling positions of the FAB at one time. The analyzing results provide a continuous, online, and real-time monitoring of these contaminant levels so as to help identify sources, stabilize production and prevent unexpected shortfalls of the service life of filtration units.

According to some embodiments of present disclosure, a method of monitoring a semiconductor fabrication facility is provided. The method includes collecting an ambient air in a clean room through a plurality of gas lines with their gas inlets arranged at a plurality of sampling positions in the clean room. The method also includes measuring a parameter of the ambient air by a plurality of metrology devices which are connected to the gas lines. At least two of the sampling positions are measured simultaneously. The method further includes issuing a warning when the parameter detected by the metrology devices is outside a range of acceptable values.

According to some embodiments of present disclosure, a method of monitoring a semiconductor fabrication facility is provided. The method includes collecting an ambient air in a first processing area and a second processing area of a clean room. The method also includes monitoring a parameter of the ambient air in both of the first processing area and the second processing area by a plurality of metrology devices. The method further includes issuing a warning when the parameter detected by the metrology devices in at least one of the first processing area and the second processing area is outside a range of acceptable values.

According to other embodiments of present disclosure, a semiconductor fabrication facility (FAB) is provided. The FAB includes a clean room and a sub-clean room. The sub-clean room is located underneath the clean room and separated from the clean room by a raised floor. The FAB also includes a number of gas lines extending from the clean room to the sub-clean room, wherein each of the gas lines comprises a gas inlet, and the gas inlets are positioned at different sampling positions in the clean room. The FAB further includes a number of metrology devices. Each of the metrology devices is connected with one of the gas lines and configured to measure a parameter of the ambient air collected from the sampling positions. In addition, the FAB includes a database server configured to process measurement results produced by the metrology devices and to identify an abnormity while the parameter is outside a range of acceptable values.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of monitoring a semiconductor fabrication facility, comprising:
    collecting an ambient air in a clean room through a plurality of gas lines with their gas inlets arranged at a plurality of sampling positions in the clean room;
    measuring a parameter of the ambient air by a plurality of metrology devices which are connected to the gas lines, wherein at least two of the sampling positions are measured simultaneously through at least two of the metrology devices; and
    issuing a warning when the parameter detected by the metrology devices is outside a range of acceptable values.

2. The method as claimed in claim 1, wherein the ambient air is collected at the sampling positions which are arranged in array in the clean room.

3. The method as claimed in claim 1, wherein a time interval between two measurements of the concentration of the ambient air by each of the metrology devices is within 2 seconds.

4. The method as claimed in claim 1, wherein the collecting the ambient air in the clean room is performed such that the ambient air is pumped into the gas inlets that are positioned on a raised floor of the clean room on which one or more processing tools for fabricating semiconductor wafers are located.

5. The method as claimed in claim 4, wherein the ambient air in the gas lines are guided to the metrology devices which are positioned in a chassis located in a sub-clean room underneath the raised floor.

6. The method as claimed in claim 1, wherein the parameter comprises total organic carbon (TOC) concentration, and the operation of measuring the parameter of the ambient air comprises:
    forming ions by ionizing the ambient air;
    guiding the ambient air which is ionized to a detecting unit; and
    measuring an electric current produced by ions to determine the TOC concentration according to the electric current.

7. The method as claimed in claim 1, wherein the parameter comprises TOC concentration and the method further comprises:
    generating a TOC concentration contour map of the clean room according to measurement results produced by the metrology devices and data in relation to locations of the sampling positions.

8. The method as claimed in claim 1, wherein after the warning is issued, the method further comprises:
    collecting the ambient air from the clean room through a sampling tube; and
    identifying species in the ambient air collected by the sampling tube through a mass spectrometry.

9. A method of monitoring a semiconductor fabrication facility, comprising:
    collecting an ambient air in a first processing area and a second processing area of a clean room through a plurality of gas lines, wherein each of the gas lines has a gas inlet, which is formed at one end thereof and exposed to the clean room;
    monitoring a parameter of the ambient air in both of the first processing area and the second processing area by a plurality of metrology devices; and
    issuing a warning when the parameter detected by the metrology devices in at least one of the first processing area and the second processing area is outside a range of acceptable values.

10. The method as claimed in claim 9, wherein the number of the metrology devices for monitoring the parameter in an unit area of the first processing area is different from the number of the metrology devices for monitoring the parameter in an unit area of second processing area.

11. The method as claimed in claim 9, wherein a time interval between two measurements of the parameter of the ambient air in the first processing area is different from a time interval between two measurements of the parameter of the ambient air in the second processing area.

12. The method as claimed in claim 9, wherein the range of acceptable values in the first processing area is different from the range of acceptable values in the second processing area.

13. The method as claimed in claim 9, wherein the collecting the ambient air in the clean room is performed such that the ambient air is pumped into the plurality of gas lines through their gas inlets, wherein the gas inlets are positioned on a raised floor of the clean room on which the processing tools are located.

14. The method as claimed in claim 9, wherein the parameter comprises total organic carbon (TOC) concentration, and the operation of monitoring the parameter of the ambient air comprises:

forming ions by ionizing the ambient air;

guiding the ambient air which is ionized to a detecting unit; and measuring an electric current produced by ions to determine the TOC concentration according to the electric current.

15. The method as claimed in claim 9, wherein the parameter comprises TOC concentration and the method further comprises:

generating a TOC concentration contour map of the clean room according to measurement results produced by the metrology devices and data in relation to the locations of a plurality of sampling positions at which the ambient air is collected.

16. The method as claimed in claim 9, wherein after the warning is issued, the method further comprises:

identifying location of the abnormality;

collecting the ambient air from one of the first processing area and the second processing area that is identified abnormal; and identifying species in the ambient air through mass spectrometry.

17. A semiconductor fabrication facility, comprising:

a clean room;

a sub-clean room located underneath the clean room and separated from the clean room by a raised floor;

a plurality of gas lines extending from the clean room to the sub-clean room, wherein each of the gas lines comprises a gas inlet, and the gas inlets are positioned at different sampling positions in the clean room;

a plurality of metrology devices, wherein each of the metrology devices is connected with one of the gas lines and configured to independently measure a parameter of an ambient air collected from the sampling positions by the one of the gas lines; and a database server configured to process measurement results produced by the metrology devices and to identify an abnormity while the parameter is outside a range of acceptable values.

18. The semiconductor fabrication facility as claimed in claim 17, wherein the metrology devices each comprises a photo ionization detector.

19. The semiconductor fabrication facility as claimed in claim 17, further comprising a plurality of pumps connected to the gas lines and configured to collect the ambient air from the clean room to the metrology devices.

20. The semiconductor fabrication facility as claimed in claim 17, wherein the clean room comprises a first processing area and a second processing area, wherein different processing tools are positioned in the first processing area and the second processing area to perform different processes over semiconductor wafers, and the number of sampling positions per unit area in the first processing area is different from the number of the sampling positions per unit area in the second processing area.

* * * * *